(12) United States Patent
Dong et al.

(10) Patent No.: US 10,723,064 B2
(45) Date of Patent: Jul. 28, 2020

(54) DEVICE AND METHODS FOR ARMORING HEAT SHRINK KITS FOR IMPACT AND FLAMMABILITY PROTECTION

(71) Applicant: nVent Services GmbH, Schaffhausen (CH)

(72) Inventors: Wesley Dong, Belmont, CA (US); Wade DePolo, Sunnyvale, CA (US)

(73) Assignee: nVent Services GmbH, Schaffhausen (CH)

( * ) Notice: Subject to any disclaimer, the term of this patent is extended or adjusted under 35 U.S.C. 154(b) by 0 days.

(21) Appl. No.: 16/599,953

(22) Filed: Oct. 11, 2019

(65) Prior Publication Data

US 2020/0114568 A1    Apr. 16, 2020

Related U.S. Application Data

(60) Provisional application No. 62/744,485, filed on Oct. 11, 2018.

(51) Int. Cl.
| | | |
|---|---|---|
| *H02G 15/18* | (2006.01) | |
| *B29C 63/00* | (2006.01) | |
| *H01B 13/26* | (2006.01) | |
| *B29C 63/18* | (2006.01) | |

(52) U.S. Cl.
CPC .......... *B29C 63/0017* (2013.01); *B29C 63/18* (2013.01); *H01B 13/26* (2013.01); *H02G 15/1806* (2013.01)

(58) Field of Classification Search
CPC ................ H02G 15/1806; H01B 13/26; B29C 63/0017; B29C 63/18
USPC ....................................................... 174/84 R
See application file for complete search history.

(56) References Cited

U.S. PATENT DOCUMENTS

| | | | |
|---|---|---|---|
| 3,054,847 A | | 9/1962 | Colbert |
| 4,142,592 A | | 3/1979 | Brusselmans |
| 4,221,457 A | | 9/1980 | Allen et al. |
| 4,289,553 A | | 9/1981 | Nolf |
| 4,421,945 A | | 12/1983 | Moisson |
| 4,778,948 A | * | 10/1988 | Fitch ........................ H01R 4/72 156/49 |
| 4,825,016 A | | 4/1989 | Meltsch et al. |
| 5,061,823 A | * | 10/1991 | Carroll ..................... H01B 7/22 174/105 R |

(Continued)

FOREIGN PATENT DOCUMENTS

| | | |
|---|---|---|
| CN | 107994517 A | 5/2018 |
| EP | 1571887 A2 | 7/2005 |
| WO | 2010075873 A1 | 7/2010 |

OTHER PUBLICATIONS

International Search Report, Application No. PCT/IB2019/001107; dated Feb. 17, 2020, 34 pages.

*Primary Examiner* — Sherman Ng
(74) *Attorney, Agent, or Firm* — Quarles & Brady LLP

(57) ABSTRACT

An armor for a heat shrink kit for joining a first length of heating cable and a second length of heating cable. The armor includes a spring configured to be positioned over at least a portion of the heat shrink kit, a first fastener configured to couple the spring to at least one of the first length of heating cable and the heat shrink kit, and a second fastener configured to couple the spring to at least one of the second length of heating cable and the heat shrink kit. The armor is configured to provide impact protection to the heat shrink kit.

16 Claims, 7 Drawing Sheets

(56) References Cited

U.S. PATENT DOCUMENTS

| | | | |
|---|---|---|---|
| 5,212,350 A * | 5/1993 | Gebs | H01B 11/1808 |
| | | | 156/50 |
| 5,283,849 A * | 2/1994 | Cooke | G02B 6/3861 |
| | | | 385/77 |
| 6,103,975 A | 8/2000 | Krabs et al. | |
| 6,454,598 B1 | 9/2002 | Burwell et al. | |
| 6,479,752 B1 * | 11/2002 | Neuroth | E21B 17/1028 |
| | | | 174/106 R |
| 7,180,040 B2 | 2/2007 | Jones | |
| 7,230,214 B2 | 6/2007 | Kirby | |
| 8,707,515 B2 | 4/2014 | Payne et al. | |
| 9,245,669 B2 | 1/2016 | Glew | |
| 9,425,605 B2 | 8/2016 | Yaworski | |
| 10,068,682 B2 | 9/2018 | Itani et al. | |
| 2001/0052420 A1 | 12/2001 | Ito | |
| 2003/0141095 A1 | 7/2003 | Roosen et al. | |
| 2004/0118585 A1 | 6/2004 | Pastuch | |
| 2004/0211770 A1 | 10/2004 | Renwick et al. | |
| 2011/0147543 A1 | 6/2011 | Koga | |
| 2011/0284287 A1 | 11/2011 | Glew | |
| 2012/0211255 A1 | 8/2012 | Senet | |
| 2015/0221416 A1 | 8/2015 | Schad et al. | |

* cited by examiner

DEVICE AND METHODS FOR ARMORING HEAT SHRINK KITS FOR IMPACT AND FLAMMABILITY PROTECTION

RELATED APPLICATIONS

This application is based on, claims priority to, and incorporates herein by reference in its entirety, U.S. Provisional Application Ser. No. 62/744,485, filed Oct. 11, 2018, and entitled "Device and Methods for Armoring Heat Shrink Kits for Impact and Flammability Protection."

BACKGROUND

During construction or repair of electrical systems, it may be necessary to join two cables together. Heat shrink kits that utilize heat shrink tubing can be used to join the two cables together. Heat shrink kits can be splice kits or cold-lead kits. Splice kits can utilize soldering to connect two identical cables. Cold-lead kits utilize mechanical connectors which may have crimp connections. Once the cables are joined together, there may be exposed wires or mechanical connectors in between insulated sections of the two cables. The exposed section can be covered with heat shrink tubing, which can provide a barrier against moisture as well as electrical insulation.

Heat shrink tubing can include an adhesive lining. Adhesive lined heat shrink tubing is ubiquitous, and is an effective moisture sealer and electrical insulator. Its moisture sealing properties can be improved with the addition of mastic tape when the tape is wrapped around wires and connectors prior to shrinking the tubes. However, being polymeric in construction, the heat shrink tubing's resistance to impact such as cold impact (typically −20° C.) and flammability is limited, even when the tubing contains flame retardants. In many applications, resistance to impact and/or flammability is of great concern. For example, following changes to IEC standard 62395-2-1 to Edition 2, flammability and impact resistance are now required for heat shrink kits for electrical resistance trace heating systems. However, end users may desire a heat shrink kit with resistance to impact and/or flammability for use with any type of cable.

Past heat shrink kits have failed to provide impact resistance and/or flammability resistance. It has been empirically observed in impact testing of splice kits versus cold lead type kits that cold-lead kits are more prone to impact damage. It is believed this is because cold lead kits have air gaps (voids) beneath the heat shrink tubing due to the size and shape differences of the cold lead compared to the heating cable. In contrast, splice kits, where two identical pieces of heating cable are joined, have little or no air gap, and are almost a solid mass. The solid construction may reduce damage due to impact by providing better support and lower impact pressure compared to the cold lead kit. However, both splice kits and cold lead kits can fail to provide flammability resistance due to the polymeric nature of heat shrink tubing.

Methods other than heat shrink kits can provide impact resistance and/or flammability resistance, all with drawbacks. For example, one current solution is a splice kit including a metal shell sealed with Room-Temperature-Vulcanizing (RTV) silicone sealant and mechanical connectors. This method can provide impact and flammability resistance, but can be messier and more difficult to use than heat shrink kits. Other approaches involve non-heat shrink mechanical kits that are much more costly than heat shrink kits.

SUMMARY

The invention addresses the need for a cost effective and easy-to-use method to armor heat shrink kits that overcome the above drawbacks in order to provide impact and/or flammability resistance. In one aspect, an armor for a heat shrink kit for joining a first length of heating cable and a second length of heating cable is provided by the present disclosure. The armor includes a spring configured to be positioned over at least a portion of the heat shrink kit, a first fastener configured to couple the spring to at least one of the first length of heating cable and the heat shrink kit, and a second fastener configured to couple the spring to at least one of the second length of heating cable and the heat shrink kit. The armor is configured to provide impact protection to the heat shrink kit.

In the armor, the first length of heating cable can be a low smoke zero halogen heating cable.

In the armor, the inner diameter of the spring can be about 1.1 to 1.5 times as large as a largest cross sectional dimension of the heat shrink tubing.

In the armor, the spring can be a compression spring.

In the armor, the spring can be configured to be positioned over connectors included in the heat shrink kit.

In the armor, the spring can include steel.

In the armor, the first fastener can be a metallic cable tie.

In the armor, the spring can be configured to provide impact protection to the heat shrink kit at temperatures of about −20° Celsius.

In the armor, the heat shrink kit can include a heat shrink tubing and at least one mechanical connector configured to join the first length of heating cable and the second length of heating cable. The heat shrink tubing can include at least one of fluorinated ethylene propylene, polytetrafluoroethylene, Kynar, polyvinyl chloride, neoprene, silicone elastomer, Viton, and polyvinylidene difluoride. The at least one mechanical connector can include a crimp connector.

In the armor, the spring can have about five to ten turns per inch.

In the armor, the spring may not comprise an electrical insulator.

In the armor, the armor can be configured to provide flammability protection to the heat shrink kit.

In another aspect, an armored heat shrink assembly is provided by the present disclosure. The armored heat shrink assembly includes at least one mechanical connector configured to electrically couple a first length of heating cable to a second length of heating cable at a splice, a heat shrink tubing configured to slide over the splice with the at least one mechanical connector coupled to the first and second lengths of heating cable, and to be shrunk over the splice to electrically insulate the splice, a spring configured to be positioned over at least a portion of the heat shrink tubing, and at least one fastener configured to couple the spring to at least one of the first length of heating cable, the second length of heating cable, and the heat shrink tubing, at a position whereby the spring provides impact protection to the splice.

In the armored heat shrink assembly, an inner diameter of the spring is about 1.1 to 1.5 times as large as a largest cross sectional dimension of the heat shrink tubing.

In the armored heat shrink assembly, the spring can be a compression spring.

In the armored heat shrink assembly, the spring can be configured to be positioned over the at least one mechanical connector.

In yet another aspect, an armor for a heat shrink kit for joining a first length of heating cable and a second length of heating cable is provided by the present disclosure. The armor includes a metal spring configured to be positioned over at least a portion of the heat shrink kit, a first fastener configured to couple the spring to at least one of the first length of heating cable and the heat shrink kit, and a second fastener configured to couple the spring to at least one of the second length of heating cable and the heat shrink kit. The armor is configured to provide impact protection to the heat shrink kit at temperatures of about −20° Celsius.

In the armor, the heat shrink kit can include a heat shrink tubing and at least one mechanical connector configured to electrically couple the first length of heating cable and the second length of heating cable.

DETAILED DESCRIPTION

Figure 1:
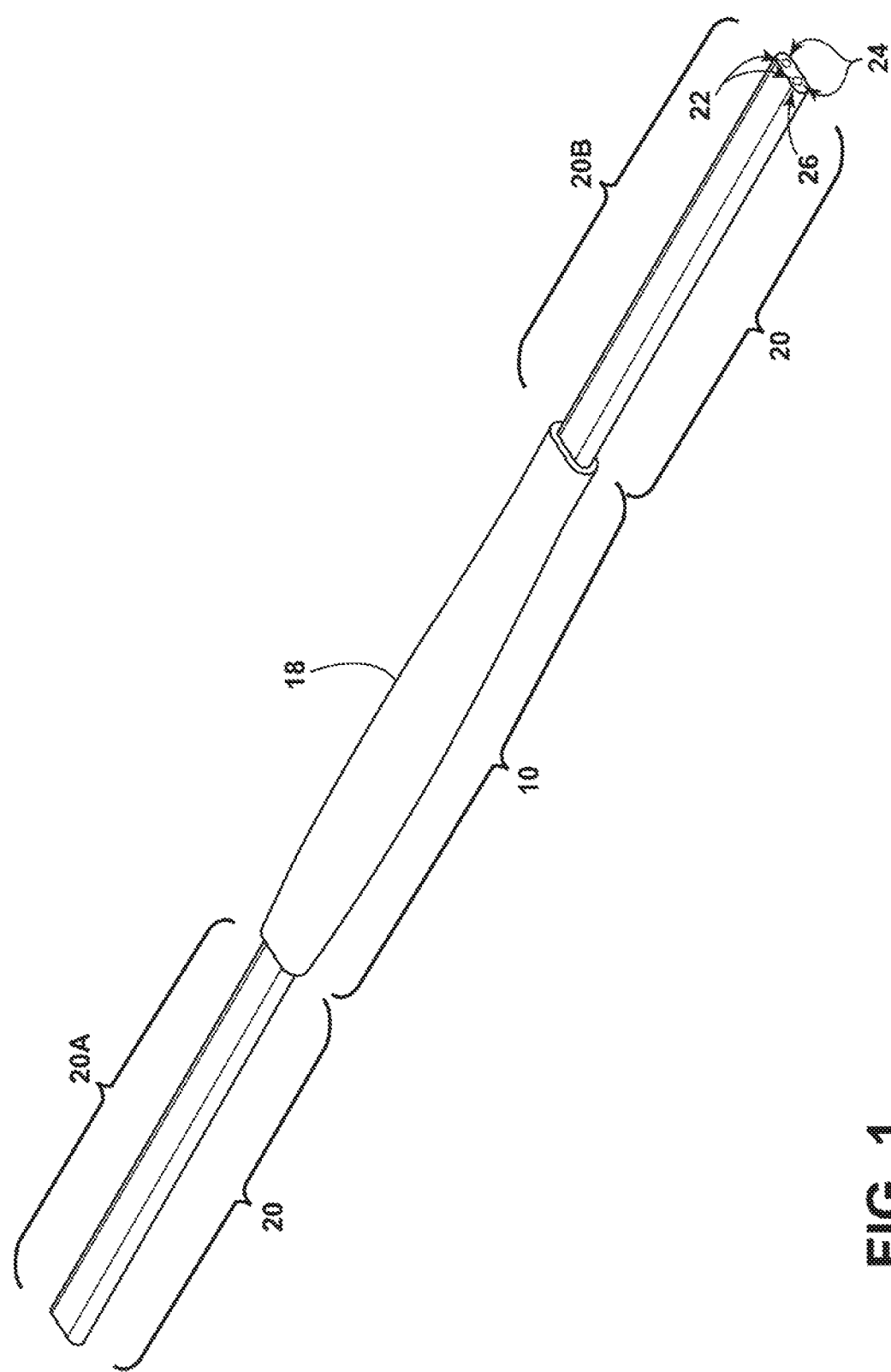
FIG. 1 is an exemplary embodiment of a heat shrink kit on a cable.

Referring to FIG. 1, an exemplary embodiment of a heat shrink kit 10 on a cable 20 is shown. The heat shrink kit 10 may be a splice kit or a cold-lead kit or an end seal kit. If the heat shrink kit 10 is a splice kit, the heat shrink kit 10 can include a solder connection 12 (not shown) that connects a first length 20A of the cable 20 to a second length 20B of the cable 20. If the heat shrink kit 10 is a cold-lead kit, the heat shrink kit 10 can include a mechanical connector 14 (not shown). The mechanical connector 14 can be a push in wire fitting, a crimp connector such as a barrel crimp or crimp cap, or any other mechanical connector to join two lengths of cable together without the use of heat. The mechanical connector can also electrically couple the first length 20A to the second length 20B of the cable in order to provide an electrical connection between conducting cores of two lengths of cable, as will be described below. The heat shrink kit 10 may include a heat shrink tubing 18. The heat shrink tubing 18 can be made from polyolefin, a fluoropolymer such as fluorinated ethylene propylene (FEP), polytetrafluoroethylene (PTFE), or Kynar, polyvinyl chloride (PVC), neoprene, silicone elastomer, Viton, or any other appropriate material that can shrink after heat is applied in order to provide a moisture barrier and/or electrical insulation. The cable 20 can be a low smoke zero halogen heating cable.

The cable 20 can be a self-regulating heating cable. The cable 20 may include a core 22, a layer of insulation 24, and a jacket 26. In a corrosive environment, the cable 20 may further include a sheath (not shown). The core 22 may pass through the radial center of the cable 20 and extend in an axial direction. The core 22 may, for example, be a copper wire or other electrically conductive material. The insulation 24 may extend radially outward from the core 22 and may extend in an axial direction to substantially encompass the core 22. The insulation 24 may be an inorganic and non-conductive material, such as magnesium oxide powder or other flame resistant and nonconductive material. The jacket 26 may extend radially outward from the insulation 24 and may extend in an axial direction to substantially encompass the insulation 24. The jacket 26 may be made of a metal material, such as copper or steel, and provides protection to the core 22 and the insulation 24. The jacket 26 may be covered by a sheath (not shown), and the jacket 26 may be made of a polymer, or other corrosion resistant material, however this may reduce the flammability resistance of the cable 20. The cable 20 may have plurality of cores 22. Each of the cores 22 may have an insulation layer 24. There may be a secondary insulation layer 25 (not shown) that encompasses the plurality of cores 22 and their respective insulation layers 24.

Figure 2:
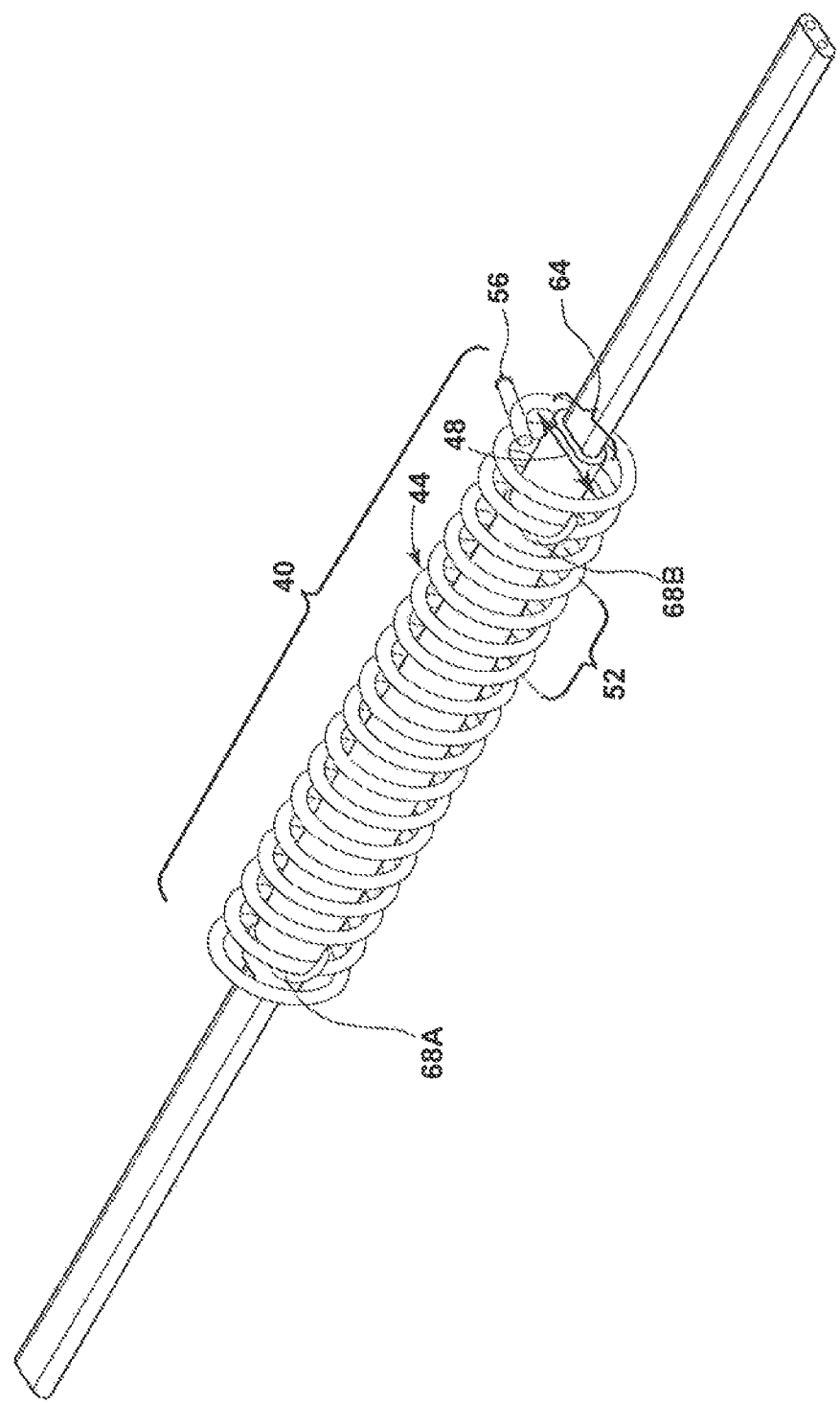
FIG. 2 is an exemplary embodiment of an armor for the heat shrink kit of FIG. 1.

Referring to FIG. 1 as well as FIG. 2, an exemplary embodiment of an armor 40 for the heat shrink kit 10 of FIG. 1 is shown. By adding an impact resistant, non-flammable armor 40 around the heat shrink tubing 18, the armor 40 can provide impact protection and/or flammability protection for the heat shrink kit 10. Subsequently, the performance of the heat shrink kit 10 in hazardous environments and/or standardized testing can be substantially improved. The armor 40 does not need to be a moisture barrier, nor an electrical insulator, as these functions can performed by the heat shrink tubing 18. For the armor 40, metals can be an optimal material of construction, although not the only suitable material type.

In this embodiment, the armor 40 can include a spring 44. The spring 44 can be appropriately sized in order effectively provide impact protection to the heat shrink kit 10. Some parameters of the spring 44 that need to be selected appropriately in order to effectively provide impact protection include an inner diameter 48, turns per unit length 52, thickness 56, and/or material. The inner diameter 48 should be sufficiently large that the spring 44 may be slid over the heat shrink tubing 18. The spring 44 can be positioned over at least a portion of the heat shrink kit 10. The inner diameter 48 can be range from about 1.1 to 1.5 times a largest cross sectional dimension 64 of the heat shrink tubing 18. The turns per unit length 52 of the spring 44 can range from about 5 turns per inch to 10 turns per inch. The thickness 56 can range from about 16 gauge to 8 gauge. Suitable materials can include steel, aluminum, or any other material that has a relatively high heat capacity, relatively high tensile strength, and can be formed into a spring shape. Suitable springs 44 can include compression springs sized appropriately as described above. In some embodiments, if the heat shrink kit 10 is a splice kit, a McMaster Carr 9657K212 may be used as the spring 44. If appropriately sized, the spring 44 can also act as a heat absorber as well, allowing the heat shrink kit 10 to pass flammability testing. The armor 40 can also include one or more spring fasteners such as a first spring fastener 68A and a second spring fastener 68B. The spring fasteners 68A, 68B can be used to fasten the spring 44 to the heat shrink kit 10. Each spring fastener, for example the first spring fastener 68A, can be a short length of wire, a metallic cable tie or any other device for attaching the spring 44 to the heat shrink kit 10 and/or the cable 20. The spring fasteners 68A, 68B can be formed from a suitable fixing material including any material with a relatively high heat capacity and/or relatively high tensile strength, such as steel or aluminum. In some embodiments, one spring fastener (e.g., the first spring fastener 68A) can be looped around a single turn of the spring 44 and around the heat shrink kit 10. In some embodiments, one spring fastener (e.g., the first spring fastener 68A) can be looped around a single turn of the spring 44 and around the cable 20. In an alternative embodiment, the armor 40 can be attached to the heat shrink kit 10 when the heat shrink kit 10 is a heat shrink end kit located on an end of the cable 20. In this alternative embodiment, cable 20 would only have one length of cable, such as first length 20A of the cable 20.

Figure 3:
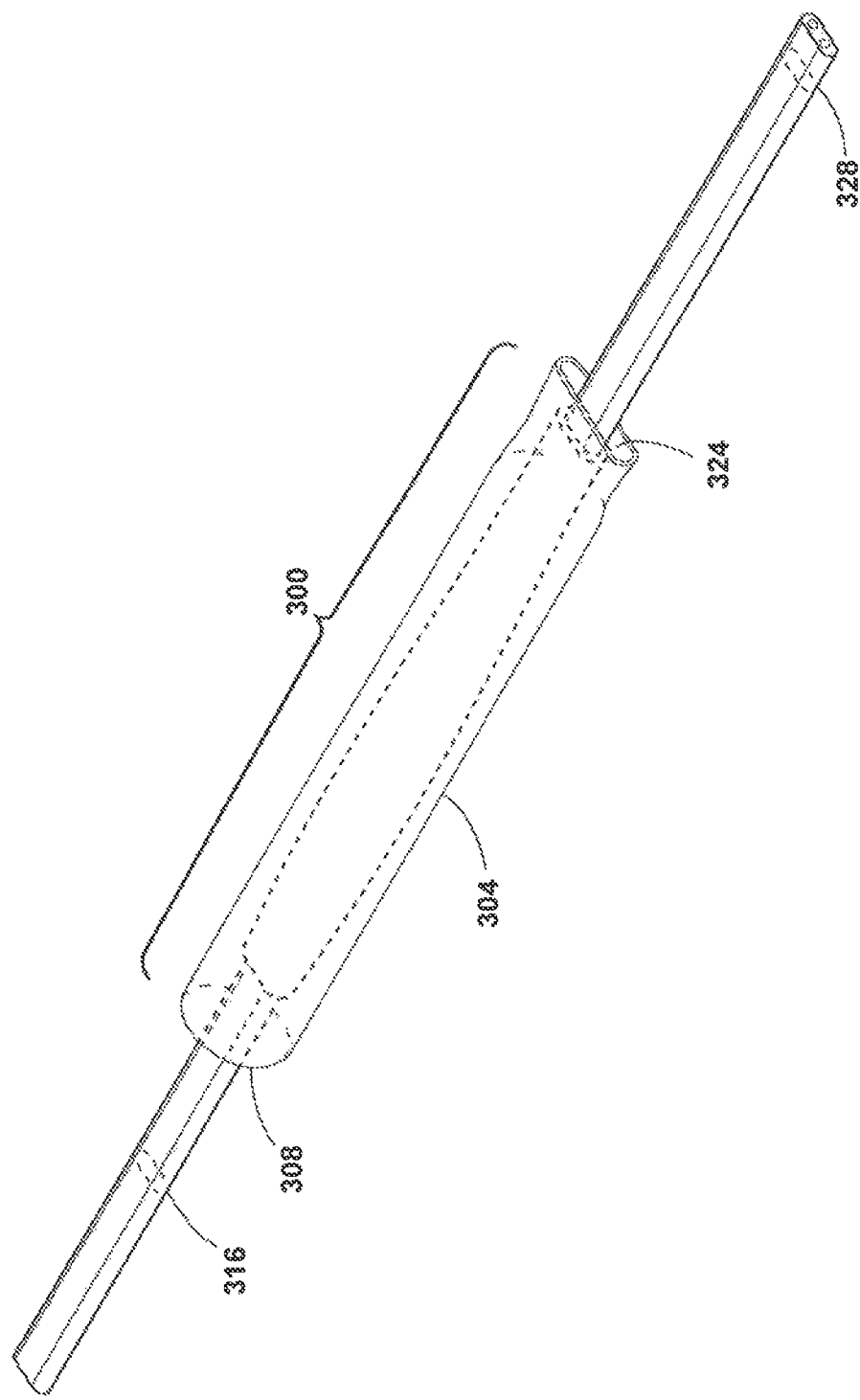
FIG. 3 is another exemplary embodiment of an armor for the heat shrink kit of FIG. 1.

Referring to FIG. 1 as well as FIG. 3, another exemplary embodiment of an armor 300 for the heat shrink kit 10 of FIG. 1 is shown. In this embodiment, the armor 300 can include a crimp tube 304. The crimp tube 304 can be made of any material with a relatively high heat capacity and/or relatively high tensile strength, such as steel or aluminum. The crimp tube 304 can be flexible conduit. The crimp tube 304 can provide impact protection and flammability protection to the heat shrink kit 10. The crimp tube 304 can be constructed of sturdy materials such as steel, which can provide excellent impact protection at a wide range of temperatures, ranging from approximately −70° C. to 500° C. or more. The crimp tube 304 may be sized as to minimally contact or not contact the heat shrink kit 304. This can allow the energy from an impact to be absorbed mostly or entirely by the armor. Additionally, the crimp tube 304 can provide an excellent barrier to flame because it is fireproof and is a radiant heat barrier. The crimp tube 304 can prevent direct contact of hot gases onto the heat shrink kit 10. Any air gap between the crimp tube 304 and the heat shrink kit 10 can further insulate the heat shrink kit 10.

The crimp tube can have a first opening 308. The first opening 308 can be formed such that the crimp tube 304 can be slid over the heat shrink kit 10. The first opening 308 can then be crimped, forming a first crimp 312 (not shown). The first crimp 312 can roughly follow a perimeter 316 of the first length 20A. The first crimp 312 can affix the crimp tube 304 to the first length 20A. The first crimp 312 can provide a seal 320 (not shown) between the crimp tube 304 and the first length 20A. The seal 320 can allow transfer of impact force into the first length 20A. The cable 20 can itself be resistant to shock, and can tolerate significant impact forces that the crimp tube 304 may transfer to the first length 20A. The seal 320 can provide a barrier to flame as well as prevent direct contact of hot gases onto the heat shrink kit 10.

The crimp tube 304 can have a second opening 324. The second opening 324 can be formed such that it roughly follows the shape of a perimeter 328 of the second length 20B. The second opening 324 can provide a seal 332 (not shown) between the crimp tube 304 and the second length 20B. The seal 332 can allow transfer of impact force into the second length 20B. The cable 20 can itself be resistant to shock, and can tolerate significant impact forces that the crimp tube 304 may transfer to the second length 20B. The seal 332 can provide a barrier to flame as well as prevent direct contact of hot gases onto the heat shrink kit 10. Alternatively, the second opening can have the same properties as the first opening 308.

Figure 4:
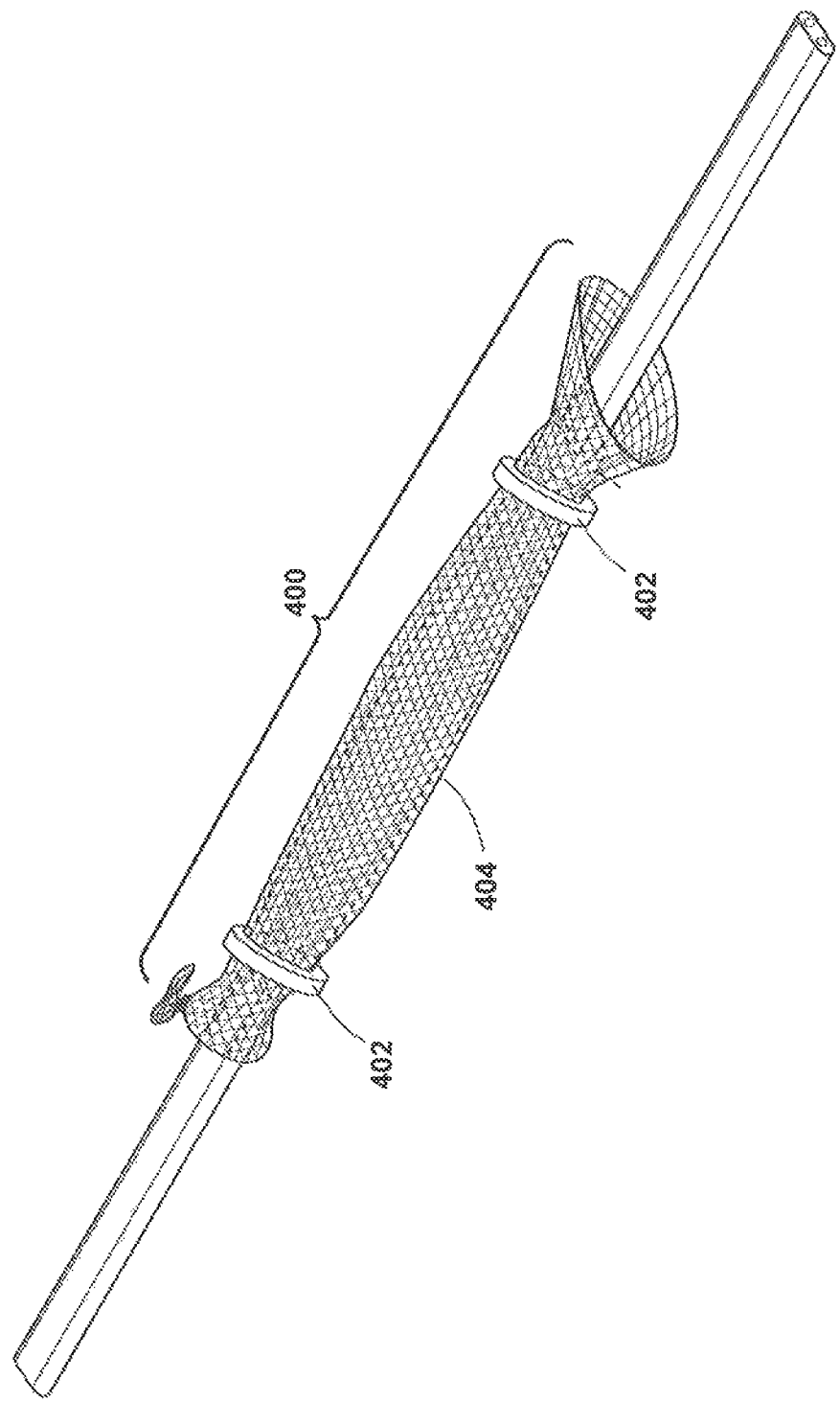
FIG. 4 is an additional exemplary embodiment of an armor for the heat shrink kit of FIG. 1.

Referring to FIG. 4, an additional exemplary embodiment of an armor 400 for the heat shrink kit 10 of FIG. 1 is shown. In this embodiment, the armor 400 can include a sleeve 404. The sleeve 404 can be sized to fit snugly around the heat shrink kit 10. The sleeve 404 may be held around the heat shrink kit 10 without any additional fastening device. In an alternative embodiment, the sleeve 404 can held around the heat shrink kit 10 by one or more sleeve fasteners 402. The sleeve fasteners 402 can be a short length of wire, a metallic cable tie or any other device for attaching the sleeve 404 to the heat shrink kit 10 and/or the cable 20. The sleeve fasteners 402 can be made of a suitable fixing material including any material with a relatively high heat capacity and/or relatively high tensile strength, such as steel or aluminum.

The sleeve 404 can contain materials including knitted or woven Nomex, glass fiber, metal, Kevlar, and/or any other materials with a high heat capacity and/or high tensile strength. Alternatively, the sleeve can be aluminum tape such as ATE-180. The sleeve can provide impact protection and flammability protection to the heat shrink kit 10. The sleeve 404 can provide impact resistance at a wide range of temperatures, such as from approximately −70° C. to 500° C. or more. If the sleeve 404 is knitted and/or woven, the sleeve 404 can provide impact resistance by cushioning the heat shrink kit 10. Additionally, the sleeve 404 can provide flammability protection to the heat shrink kit 10 if the heat capacity of the material selected is high enough. In an alternative embodiment, the sleeve 404 could be placed under the spring 44 of FIG. 2 and/or the crimp tube 304 of FIG. 3 to provide additional impact protection and/or flammability protection.

Figure 5:
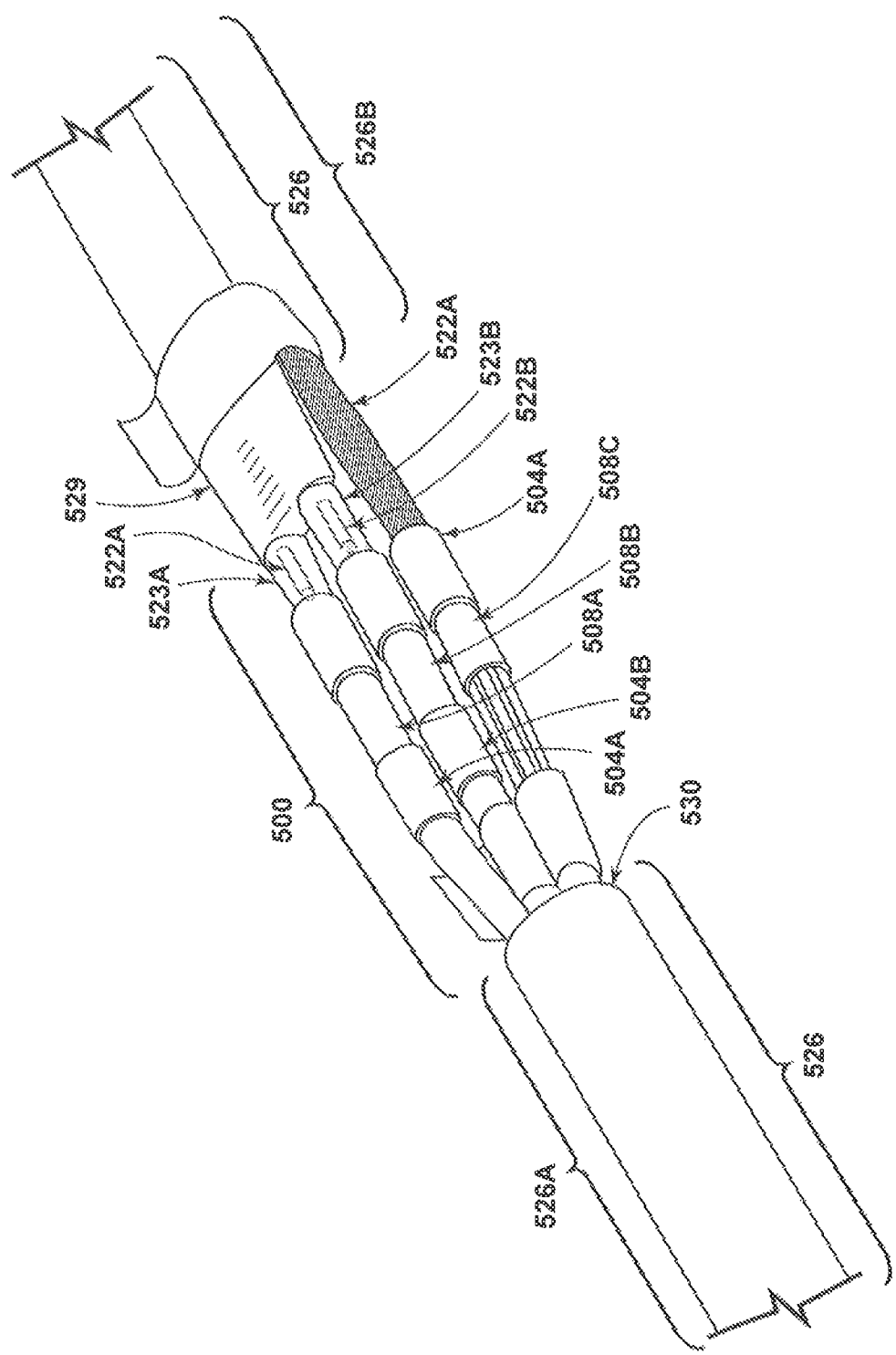
FIG. 5 is another exemplary embodiment of a heat shrink kit on a cable.

Referring now to FIG. 5, another exemplary embodiment of a heat shrink kit 500 on a cable 526 is shown. The heat shrink kit 500 can be a cold-lead kit. The heat shrink kit 500 can include one or more mechanical connectors 504. In this embodiment, there can be a first mechanical connector 504A, a second mechanical connector 504B, and a third mechanical connector 504C. The mechanical connectors 504A, 504B, 504C can be approximately cylindrical in shape. Each of the mechanical connectors 504A, 504B, 504C can have a preformed crimp area 508A, 508B, 508C. The mechanical connectors 504A, 504B, 504C can be used to connect a first core 522A, second core 522B, or third core 522C of the cable 526. The cores 522A, 522B, and/or 522C can each be encompassed by an insulation layer. In this embodiment, the 522A and 522B can have individual insulation layers 523A, 523B. The cable 526 can have a first length 526A and a second length 526B. The cable 526 can have an insulation layer 529 to provide electrical insulation and/or moisture protection for the cable 526. The cable 526 can have jacket layer 530 to provide impact protection and/or flammability protection. The heat shrink kit 500 can include a heat shrink tubing 534 (not shown) extending from the first length 526A to the second length 526B and encompassing the mechanical connectors 504A, 504B, 504C. When the heat shrink tubing 534 is constructed of certain materials, the heat shrink tubing 534 may not provide sufficient impact protection and/or flammability protection for applications in hazardous environments and/or certain cable types including heating cables. Additionally, the mechanical connectors 504A, 504B, 504C can move around somewhat freely, as there is are air gaps contained within the heat shrink tubing 534. Additionally, when the heat shrink tubing 534 is applied, the heat shrink tubing 534 can be formed with areas susceptible to stress concentrations due to the movable nature of the mechanical connectors 504A, 504B, 504C. These factors can cause the heat shrink kit 500 to be susceptible to impacts.

Figure 6:
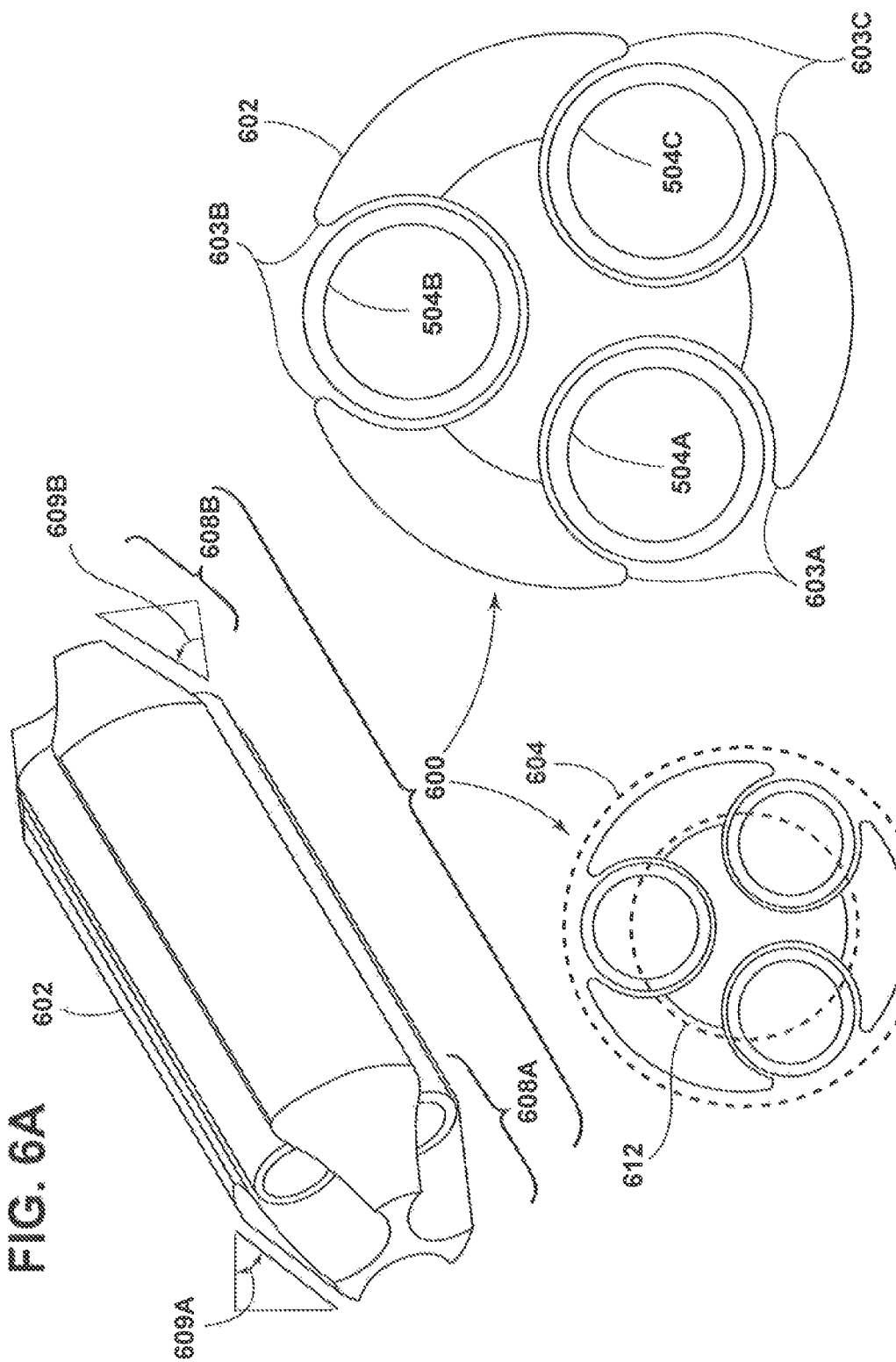
FIG. 6A is a perspective view of a further exemplary embodiment of an armor for the heat shrink kit of FIG. 5.
FIG. 6B is a side view of the armor of FIG. 6A.
FIG. 6C is another side view of the armor of FIG. 6A.

Referring to FIG. 5 as well as FIGS. 6A-C, a further exemplary embodiment of an armor 600 for the heat shrink kit 500 of FIG. 5 is shown. FIG. 6A is a perspective view of the armor 600. FIG. 6B is a side view of the armor 600. FIG.

6C is another side view of the armor 600. The armor can have an arbor 602. The arbor 602 can be located under the heat shrink tubing 534. The arbor 602 can be formed with a plurality of openings in order to accommodate the mechanical connectors 504A, 504B, 504C. In this embodiment, there are three openings 603A, 603B, 603C. However, the arbor 602 can have any number of openings in order to accommodate as many mechanical connectors 504 as needed for an application. The openings can be an equally space throughout the arbor 602. For simplicity, the mechanical connectors 504A, 504B, 504C. of FIG. 5 are not shown with inner fittings or the cable 526. As stated above, if the mechanical connectors 504A, 504B, 504C are allowed to move somewhat freely, the heat shrink kit 500 may be susceptible to impacts. The armor 600 provides impact protection to the heat shrink kit 500 by holding the mechanical connectors 504A, 504B, 504C in place, reducing stress concentrations and/or eliminating air gaps. As seen in FIG. 6B, the arbor 602 may be sized to create an approximately circular first circular perimeter 604. The circular shape of the perimeter 604 can reduce stress concentrations, support the heat shrink tubing 534, and/or provide impact protection. The arbor 602 may have a first sloped section 608A and/or a second sloped section 608B. The sloped sections 608A, 606B can be configured to reduce stress concentrations for the heat shrink kit 500 and/or the heat shrink tubing 534 by gradually sloping from the first circular perimeter 604 to a second circular perimeter 612. The second circular perimeter can be sized to be approximately a size of the insulation layer 529 and/or the jacket layer 530. If the second circular perimeter is sized approximately the same as the outermost layer of the cable 526, stress concentrations can be reduced be eliminating sharp angles in the heat shrink tubing 534, which can encompass the outermost layer of the cable 526 as well as the arbor 602. In this embodiment, the outermost layer is the jacket layer 530. The sloped sections 608A and 608B can each have a slope angle 609A and 609B respectively. Suitable values for the slope angles 609A and 609B can include 10° to 90°. If the slope angles 609A and 609B are chosen appropriately, the overall shape of the arbor 602 can minimally affect the external aesthetics of the heat shrink kit 500. The arbor 602 itself need not be circular in shape at either or both ends. For example, for a splice connection, the arbor 602 may be oval shaped, to match the generally oval shape of the heating cable. The arbor 602 would then have an approximately oval first oval perimeter and second oval perimeter in place of the first circular perimeter 604 and the second circular perimeter 612 respectively. In the case of a cold lead connection, it may be advantageous to make one side of the arbor round, and the other side oval, to provide a smooth transition from a circular to an oval cable. The arbor 602 would then have an approximately oval first oval perimeter in place of the first circular perimeter 604, while maintaining the second circular perimeter 612. To improve impact protection at low temperatures, the arbor 602 can be constructed of a material that is somewhat pliable at low temperatures, such as crosslinked elastomer. If the material is pliable at low temperatures, the arbor 602 can absorb impact energy at low temperatures in order to provide impact protection. The material can also be pliable at a wide range of temperatures such as −60° to 250° C. Additionally, the arbor 602 can be constructed of a material that is highly flame retardant to prevent melt and/or flow of the arbor 602. Suitable materials for the arbor 602 can include crosslinked elastomer. The armor 600 can also be applied when the heat shrink kit 500 is a heat shrink end kit located on an end of the cable 526.

EXPERIMENTS

Figure 7:
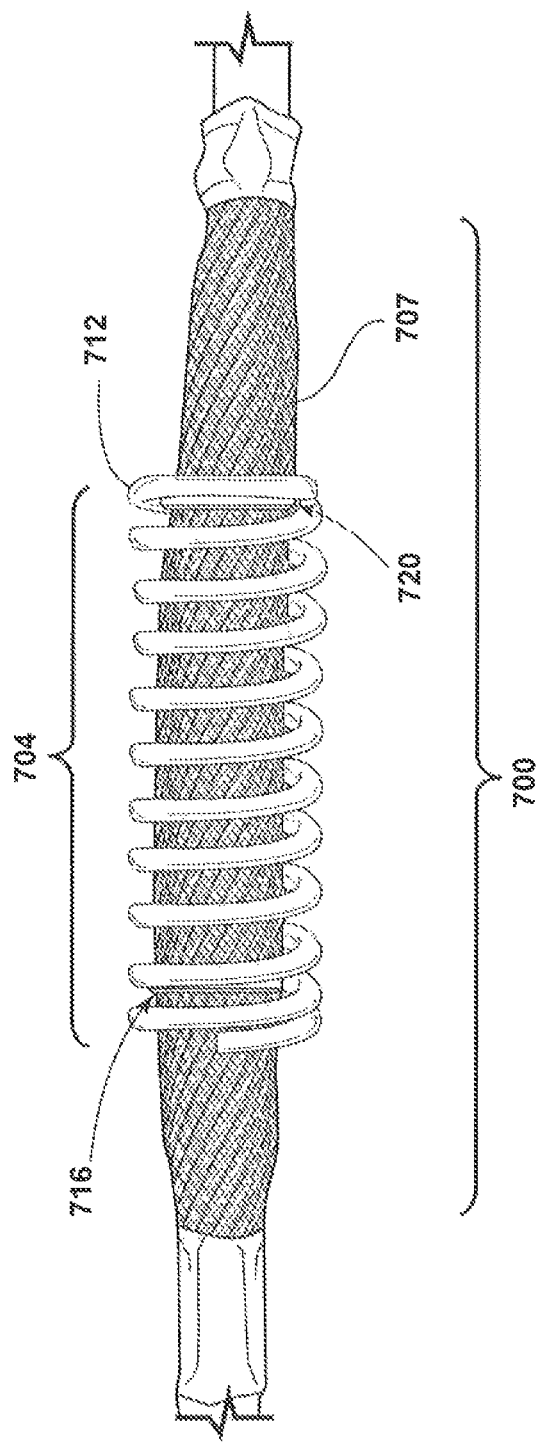
FIG. 7 is an armored heat shrink kit that was subjected to a cold impact test.

In a first experiment, an armored heat shrink kit was subjected to a cold impact test. As seen in FIG. 7, a heat shrink kit 700 was armored with an armor 704. The heat shrink kit 700 was a cold-lead kit with a polyvinylidene difluoride (PVDF) heat shrink tubing 707. The armor 704 included a spring 712.

The armor 704 also included a first spring fastener 716 and a second spring fastener 720. The spring fasteners 716, 720 were plastic zip ties. As is clear to one skilled in the art, plastic zip ties were suitable because the armor 704 was not going to be subjected to high temperatures. In a real world application, other materials would be used in the spring fasteners 716, 720. For the cold impact test, the heat shrink kit 700 and armor 704 were cooled to a temperature of −20° C. The heat shrink kit 700 and armor 704 were then subjected to an impact test that resulted in a 13.6 joule impact. The heat shrink kit 700 was sufficiently protected by the armor 704. The heat shrink kit 700 did not fail, therefore passing the cold impact test.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. An armor for a heat shrink kit for joining a first length of heating cable and a second length of heating cable, the heat shrink kit comprising a heat shrink tubing and at least one mechanical connector configured to join the first length of heating cable and the second length of heating cable, and the armor comprising: a spring configured to be positioned over at least a portion of the heat shrink kit; a first fastener configured to couple the spring to at least one of the first length of heating cable and the heat shrink kit; and a second fastener configured to couple the spring to at least one of the second length of heating cable and the heat shrink kit, wherein the armor is configured to provide impact protection to the heat shrink kit, and wherein an inner diameter of the spring is about 1.1 to 1.5 times as large as a largest cross sectional dimension of the heat shrink tubing.

2. The armor of claim 1, wherein the first length of heating cable is a low smoke zero halogen heating cable.

3. The armor of claim 1, wherein the spring is a compression spring.

4. The armor of claim 1, wherein the spring is configured to be positioned over connectors included in the heat shrink kit.

5. The armor of claim 1, wherein the spring comprises steel.

6. The armor of claim 1, wherein the first fastener is a metallic cable tie.

7. The armor of claim 1, wherein the spring is configured to provide impact protection to the heat shrink kit at temperatures of about −20° Celsius.

8. The armor of claim 1, wherein the heat shrink tubing comprises at least one of fluorinated ethylene propylene, polytetrafluoroethylene, Kynar, polyvinyl chloride, neoprene, silicone elastomer, Viton, and polyvinylidene difluoride.

9. The armor of claim 1, wherein the at least one mechanical connector includes a crimp connector.

10. The armor of claim 1, wherein the spring has about five to ten turns per inch.

11. The armor of claim 1, wherein the spring does not comprise an electrical insulator.

12. The armor of claim 1, wherein the armor is configured to provide flammability protection to the heat shrink kit.

13. An armored heat shrink assembly comprising: at least one mechanical connector configured to electrically couple a first length of heating cable to a second length of heating cable at a splice; a heat shrink tubing configured to slide over the splice with the at least one mechanical connector coupled to the first and second lengths of heating cable, and to be shrunk over the splice to electrically insulate the splice; a spring configured to be positioned over at least a portion of the heat shrink tubing; and at least one fastener configured to couple the spring to at least one of the first length of heating cable, the second length of heating cable, and the heat shrink tubing, at a position whereby the spring provides impact protection to the splice, wherein an inner diameter of the spring is about 1.1 to 1.5 times as large as a largest cross sectional dimension of the heat shrink tubing.

14. The armor of claim 13, wherein the spring is a compression spring.

15. The armor of claim 13, wherein the spring is configured to be positioned over the at least one mechanical connector.

16. An armor for a heat shrink kit for joining a first length of heating cable and a second length of heating cable, the heat shrink kit comprising a heat shrink tubing and at least one mechanical connector configured to electrically couple the first length of heating cable and the second length of heating cable, and the armor comprising: a metal spring configured to be positioned over at least a portion of the heat shrink kit; a first fastener configured to couple the spring to at least one of the first length of heating cable and the heat shrink kit; and a second fastener configured to couple the spring to at least one of the second length of heating cable and the heat shrink kit, wherein the armor is configured to provide impact protection to the heat shrink kit at temperatures of about −20° Celsius, and wherein an inner diameter of the spring is about 1.1 to 1.5 times as large as a largest cross sectional dimension of the heat shrink tubing.

* * * * *